(No Model.) 2 Sheets—Sheet 1.

J. M. DODDRIDGE.
BUNCHING ATTACHMENT FOR MOWING MACHINES.

No. 588,321. Patented Aug. 17, 1897.

WITNESSES:

INVENTOR
James M. Doddridge,
BY Chester Bradford,
ATTORNEY.

(No Model.) 2 Sheets—Sheet 2.
J. M. DODDRIDGE.
BUNCHING ATTACHMENT FOR MOWING MACHINES.
No. 588,321. Patented Aug. 17, 1897.
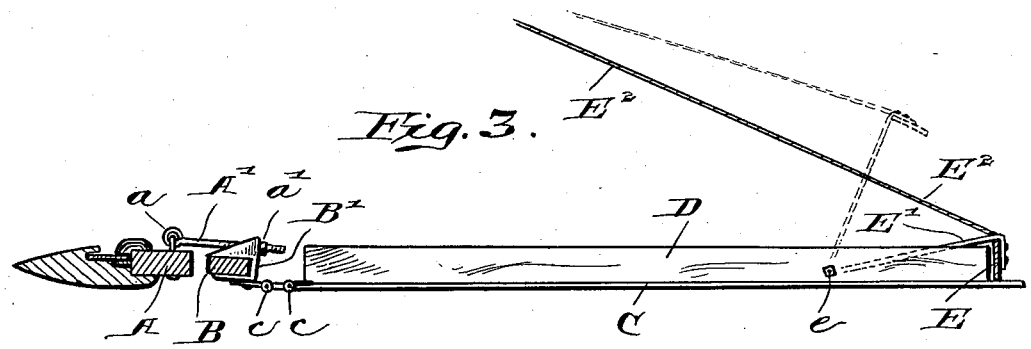
Fig. 3.
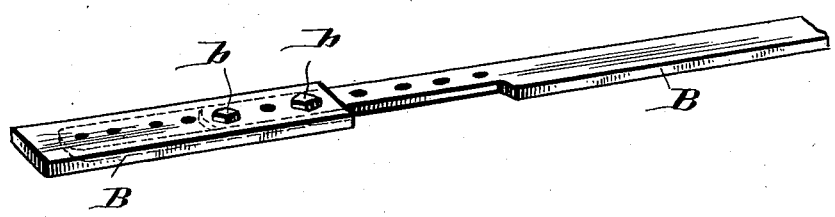
Fig. 4.
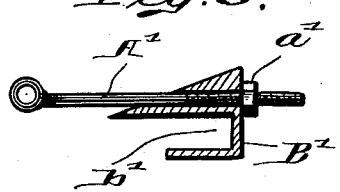
Fig. 5.
Fig. 6.
WITNESSES: H. D. Nealy. J. A. Walsh.
INVENTOR
James M. Doddridge,
BY Chester Bradford,
ATTORNEY.

UNITED STATES PATENT OFFICE.

JAMES M. DODDRIDGE, OF MILTON, INDIANA.

BUNCHING ATTACHMENT FOR MOWING-MACHINES.

SPECIFICATION forming part of Letters Patent No. 588,321, dated August 17, 1897.

Application filed May 12, 1896. Serial No. 591,204. (No model.)

*To all whom it may concern:*

Be it known that I, JAMES M. DODDRIDGE, a citizen of the United States, residing at Milton, in the county of Wayne and State of Indiana, have invented certain new and useful Improvements in Bunching Attachments for Mowing-Machines, of which the following is a specification.

My present invention relates to certain improvements in that class of devices generally denominated "bunching attachments" for mowing-machines which is especially adapted to bunching or windrowing clover as it is being cut for seed, and which consists, generally speaking, of a slatted platform attached to and extending back from the cutter-bar of such a machine.

The objects of my said invention are to simplify and render more efficient attachments of this character; and a machine embodying them will be first fully described, and the novel features then pointed out in the claims.

Figure 1:
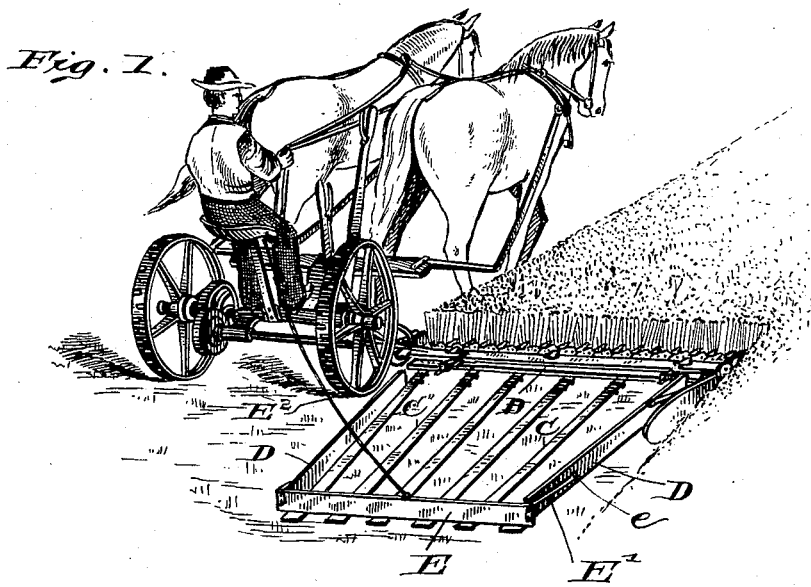
Figure 2:
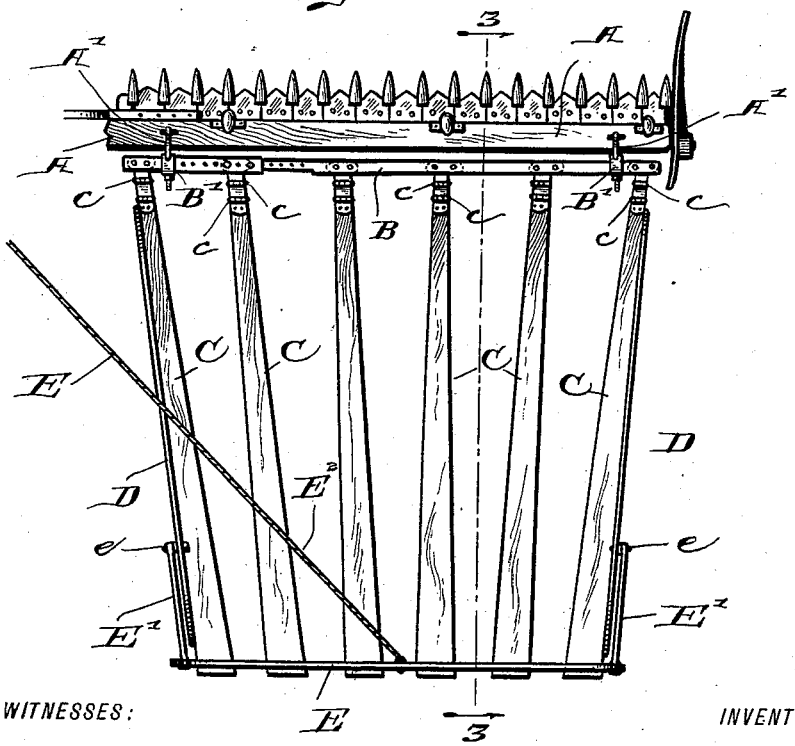

Referring to the accompanying drawings, which are made a part hereof, and on which similar letters of reference indicate similar parts, Figure 1 is a perspective view of a mowing-machine in operation provided with an attachment embodying my present invention; Fig. 2, a top or plan view of the finger-bar of the mower and said attachment separately on an enlarged scale; Fig. 3, a central sectional view on the dotted line 3 3 in Fig. 2 on a still further enlarged scale; Fig. 4, a perspective view of the adjustable front bar of the attachment; Fig. 5, a detail sectional view of the device by which said attachment is connected to the finger-bar; and Fig. 6, a detail perspective view of the front end of one of the slats, showing the hinges therein more plainly.

The mower or mowing-machine illustrated is or may be of any ordinary or desired construction and needs no special description.

My attachment is designed to be used with mowing-machines of all kinds and in which the finger-bars are of varying lengths, one object of my invention being to provide an attachment which may be used with a mower having any length of finger-bar and without change except a simple adjustment.

In said drawings the portions marked A represent the finger-bar of the mowing-machine; B, the front bar of the attachment; C, the slats thereof; D, the side-boards thereto, and E the tail bar or gate.

The finger-bar A of the machine, as already stated, is or may be of any usual or desired form and construction and of any ordinary length. As neither it nor the machine as a whole to which it is attached form any part of my present invention, they will not be further described herein except incidentally in describing said invention.

The bar B, as shown most plainly in Figs. 2 and 4, consists of two parts secured together by bolts $b$, which pass through any of a large number of holes provided therefor, as shown. Obviously this bar as a whole can be lengthened or shortened, as desired, by simply removing said bolts, "telescoping" the two parts one upon the other, and reinserting the bolts in the appropriate holes, all as will be readily understood. By this means this bar can be made to correspond in length to the finger-bar A of any machine to which my invention is attached.

The slats C are secured at suitable intervals to the bar B. As most plainly shown in Fig. 2, these slats increase in width as they approach the rear or discharging point, so that the spaces between them decrease in width. This is so that the friction on the cut clover occasioned by the stubble underneath shall be the greatest when it is first cut and less at the rear end where the bunch is formed. By this means not only is the bunch while being formed subjected to less force tending to draw it off the slatted platform, but is formed more compactly than if the spaces between the slats were of equal width, because the clover which is being carried back from the front where it is cut is subjected to greater force through the wider spaces thus produced until it finally reaches its place in the bunch being formed. These slats are each provided with hinges (preferably two) in their forward ends near the point where they are attached to the bar B. Said slats are thus adapted to yield independently of each other in passing over inequalities in the ground, and thus only a single slat will be raised when it strikes a high place or stone, and this serves to prevent short clover from being shaken through the platform and thus lost or scattered, as would be the case if the entire platform was raised in such cases.

The side-boards D are secured to the outer slats C and serve to confine the clover which is cut within the compass of the surface of the platform. These outer slats, and the side-boards with them, converge toward each other, as shown most plainly in Fig. 2, so that the bunch is drawn together endwise, as well as forced together sidewise.

The end-board or tail-gate E is in the form of a board carried by arms E', which are in turn attached to the side-boards D by pivots e. Running from this tail-gate to a point convenient to the driver is a rope or equivalent device E², by which the driver may from time to time raise said tail-gate and permit the bunch which has accumulated to be discharged. As soon as it has been discharged he releases his pull on the rope, when the tail-gate will drop by its own gravity into position, ready to do its part in the forming of another bunch, as will be readily understood. This arrangement forms an extremely simple and effective device for the purpose, and the tail-gate also serves to steady and hold to place the side-boards and the slats to which they are attached. The various positions of these parts are indicated by the dotted lines in Fig. 3.

The attachment as a whole is connected to the finger-bar by devices consisting of rods A' and hook portions B', the former of which are hinged to eyes or staples a on the finger-bars A and the latter of which hook about the bars B, as shown most plainly in Fig. 3. The construction of this device is best shown in Fig. 5. As shown, the bolt A' is provided with a nut a', and by this means the distance between the hinge-point a and the inner surface b' of the hook B' may be adjusted as desired, and thus the means of attachment is adapted to finger-bars of different widths, and the bar B being adjustable in length the attachment is adapted to variations in both length and width of the finger-bars.

Having thus fully described my said invention, what I claim as new, and desire to secure by Letters Patent, is—

1. The combination of the finger-bar of a mowing-machine, a bunching attachment for mowing-machines, and a device for connecting said finger-bar and said bunching attachment, said device being hinged or pivoted to the finger-bar and adapted to hook onto the front bar of the bunching attachment and composed of two parts one adjustable upon the other, said bunching attachment being thus easily attached and detached, or adjusted, and at the same time permitted a free vertical movement, substantially as set forth.

2. The combination, with a mowing-machine, of a bunching attachment, and a device for connecting the finger-bar of the mowing-machine and said bunching attachment, consisting of the eyebolt A' pivoted to said finger-bar, and the hook B' having a perforation which passes over said eyebolt, said hook being adapted to embrace the front bar of the bunching attachment, and a nut a' upon the end of said eyebolt whereby said hook may be adjusted nearer to or farther from the pivotal point where it is attached to the finger-bar, all substantially as shown and described.

3. The combination of the finger-bar of a mowing-machine, a bunching attachment for mowing-machines, and a device for connecting said finger-bar and said bunching attachment, said device being hinged or pivoted to the finger-bar and adapted to hook onto the front bar of the bunching attachment, and provided with an adjusting-nut, said bunching attachment being thus easily attached and detached or adjusted and at the same time permitted a free vertical movement, substantially as shown and described.

4. A bunching attachment for mowing-machines, consisting essentially of a slatted platform, the slats being tapered and increasing in width as they approach the rear end, substantially as shown and described.

5. A bunching attachment for mowing-machines consisting essentially of a slatted platform, the slats being independent of each other, and each hinged at two points, whereby they are able to yield independently of each other in passing over inequalities, substantially as set forth.

6. The combination, in a bunching attachment for mowing-machines, of a longitudinally-adjustable front bar, hinged slats extending rearwardly from said bar and converging toward each other, side-boards attached to the outer slats, a tail-gate provided with arms pivoted to said side-boards, and a rope running from said tail-gate to a point adjacent to the operator, substantially as shown and described.

7. The combination, with a mowing-machine, of a bunching attachment therefor, consisting of a longitudinally-adjustable front bar, adjustable connections between said front bar and the finger-bar of the mowing-machine, tapered slats provided with hinges and independently connected to said front bar, the rear ends whereof are wider than the front ends, and which said slats converge toward each other, side-boards on the outer slats, a tail-gate mounted on arms pivoted to said side-boards, and means for raising said tail-gate, said several parts being arranged and operating substantially as set forth.

8. A bunching attachment for mowing-machines consisting essentially of a slatted platform the slats whereof increase in width from their forward to their rear ends, the spaces between the slats being thus reduced as the rear end of the platform is approached, substantially as shown and described.

In witness whereof I have hereunto set my hand and seal, at Indianapolis, Indiana, this 9th day of May, A. D. 1896.

JAMES M. DODDRIDGE. [L. S.]

Witnesses:
CHESTER BRADFORD,
JAMES A. WALSH.